United States Patent [19]

Henss et al.

[11] 3,774,457
[45] Nov. 27, 1973

[54] TACHOMETER WITH A DISTANCE COUNTER

[75] Inventors: Heinrich Henss, Oberhochstadt; Edgar Maschke, Frankfurt am Main; Bernd Wirbel, Bischofsheim, all of Germany

[73] Assignee: VDO Tachometer Werke Adolf Schindling GmbH, Frankfurt/Main, Germany

[22] Filed: June 21, 1971

[21] Appl. No.: 154,717

[30] Foreign Application Priority Data
June 22, 1970 Austria.................................... 5617

[52] U.S. Cl............... 73/490, 73/493, 73/519, 73/527, 74/12, 235/96
[51] Int. Cl............... G01p 1/00, G01p 3/42
[58] Field of Search............. 73/490, 493, 519, 73/527; 74/12; 235/96

[56] References Cited
UNITED STATES PATENTS

| | | | |
|---|---|---|---|
| 1,670,836 | 5/1928 | Berge................................ | 73/490 |
| 3,498,139 | 3/1970 | Powell............................... | 73/519 |
| 1,300,329 | 4/1919 | Berg.................................. | 73/527 |
| 1,298,646 | 4/1919 | Berg.................................. | 74/12 |

*Primary Examiner*—Herbert Goldstein
*Attorney*—Ernest G. Montague

[57] ABSTRACT

A tachometer with a distance counter, in particular an eddy current tachometer with a drive shaft of a tachometer measuring device which comprises a counter stand receiving the distance counter and set on a bearing stand for the drive shaft. A speed reducing drive of the counter is operatively connected with the drive shaft by means of an intermediate shaft. The intermediate shaft driving the distance counter is divided into two shaft parts separately mounted in the bearing stand and the counter stand. A gear rim and a pinion are provided. The tachometer includes a pointer axle carrying a pointer. The gear rim is concentrically rotatably mounted about the pointer axle of the tachometer, and the shaft parts are coupled together by means of the pinion.

3 Claims, 2 Drawing Figures

TACHOMETER WITH A DISTANCE COUNTER

The present invention relates to a tachometer with a distance counter, in particular, an eddy current tachometer with a driving shaft of the tachometer measuring device mounted obliquely to the pointer axle in a bearing stand and a counter stand settable on the bearing stand for the driving shaft and receiving the distance counter, as well as a drive of the counting device with a reduction gear and derived from the driving shaft by means of an intermediate shaft.

Tachometers with an oblique arrangement of their driving shaft relative to the pointer axle are used, if for the connection of the flexible shaft for the operation of the tachometer such arrangement is required for reason of space or displacement. The known embodiments of these tachometers permit, however, only the connection of the flexible shaft from an exactly predetermined direction. If the connection of the flexible shaft of such tachometer is to be taken from different directions, by example in case of the same type of vehicle with left or right steering, then a possible adjustment for the driving shaft is required. Known embodiments use an angular drive for a driving shaft of the measuring system which driving shaft is of a same axis as that of the pointer axle. Such angular drive arrangement of the drive shaft does not suffice, however, for the requirements of an extremely noiseless drive of the tachometer, because in view of the relatively high number of revolutions of the driving shaft, a noise formation of the angular drive is unavoidable.

It is one object of the present invention to provide a tachometer with a distance counter in which a setting possibility of the driving shaft for about 360°, which driving shaft is mounted obliquely in the bearing stand of the tachometer, which driving shaft avoids an angular drive in the counter drive and permits an extremely noiseless operation of the tachometer.

It is another object of the present invention, to provide a tachometer with a distance counter, wherein the intermediate shaft driving the counter is divided into two shaft parts, separately mounted in the bearing stand and the counter stand, which shaft parts are coupled together over a tooth rim which is concentrically rotatably mounted about the pointer axle of the tachometer by means of a pinion. In accordance with further development of the present invention the tooth rim serving the coupling of the two intermediate shaft parts is divided into two gear disc rings of about equal height which are coupled together by means of a free wheeling coupling. In one embodiment, the free wheeling coupling comprises a ratchet tooth of the engagement faces of the two gear disc rings, which are mounted with corresponding play against a spring force. By this division of the gear ring the counter is driven only in the direction of movement of the vehicle, while during the return movement the free wheeling between the two gear ring discs becomes effective and a drive of the distance counter is omitted.

The parts of the tachometer, bearing stand and counter stand, rotatable about the pointer axle are connected together or screwed together, respectively, upon setting of the desired rotation angle for the suitable connection of the flexible shaft.

By this formation of the reduction gear drive for the distance counter, in accordance with the present invention, an angular drive is superfluous in the part having a high number of revolutions of the tachometer drive and the coupling necessary due to the rotation of the tachometer parts in the run of the reduction drive for the counter is displaced to a point, where the gear means have only a low number of revolutions, as a maximum 30 – 40 revolutions per minute. The gear rim serving this coupling, which can be mounted on the bearing stand or on the counter stand or on both tachometer parts, undergoes only as a maximum, about three to four revolutions per minute. By this arrangement, the noise formation is practically eliminated, and also the increase of the bearing friction in the counter drive remains limited to a very low degree by the insertion of the gear rim.

With these and other objects in view, which will become apparent in the following detailed description, the present invention, which is shown by example only, will be clearly understood in connection with the accompanying drawing, in which.

Figure 1:
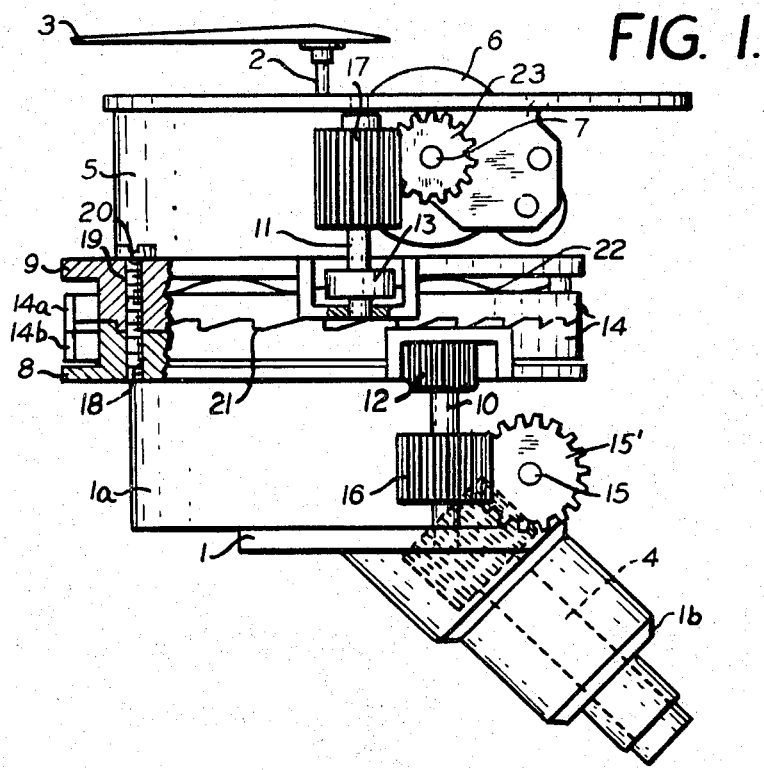
FIG. 1 is a side elevation of the tachometer, partly in section.
Figure 2:
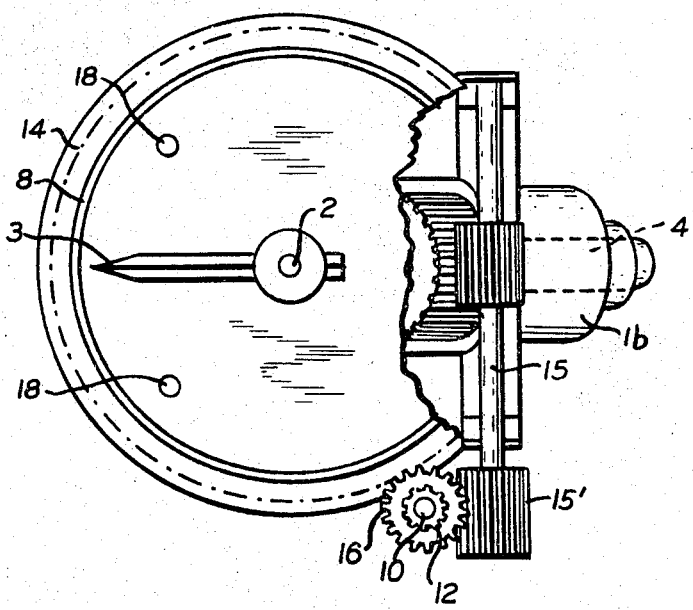
FIG. 2 is a top plan view of the bearing stand in a removed counter stand.

Referring now to the drawing, in which only the essential parts of the present invention of the reduction drive between the driving shaft of the measuring device and the distance counter are shown in detail, the remaining showing is simplified.

In a pot-like part 1a of the bearing stand or drive part 1 is mounted a tachometer measuring device of which only the pointer axle 2 with the pointer 3 are shown. The driving shaft 4 of the measuring device is in turn mounted in a branch 1 b formed obliquely to the indicator axle 2 on the bearing stand 1 such, that the center lines of the two axes cross each other. This inclined arrangement of the shaft 4 is required for reasons of the feeding and displacement of the flexible shaft for the operation of the tachometer. On the bearing stand 1 a counter stand 5 can be set in which a distance counter 6 is mounted with the counter shaft 7.

In accordance with the aim of the present invention, the bearing stand or drive part 1 is concentric about the pointer axle 2 and thereby it is settable i.e., adjustable in any position relative to the counter stand or indicator part 5. For this purpose the bearing stand 1 and the counter stand 5 have at the end sides pointing towards each other concentric to the pointer axle 2, rings 8 and 9, formed thereon, which grip into each other as shown in FIG. 1. The intermediate shaft of the reduction gear drive for the counter drive between the bearing stand and counter stand is divided, in accordance with the present invention, into two shaft parts 10 and 11 constituting the connecting shaft means, which shaft parts 10 and 11 are mounted each separately in the bearing stand 1 and the counter stand 5, respectively, and coupled together by means of the pinions 12 and 13 over the outer periphery of the rings 8 and 9 concentrically about the gear rim 14 rotatably mounted about the pointer axle 2.

The driving shaft 4 of the tachometer measuring device operates over the reduction gear, comprising the worm shaft 14 with a worm 15 and the pinion or small gear 16, driven by the shaft 4, the connecting shaft part 10 mounted in the bearing stand 1, which connecting shaft part in turn drives by means of the pinion 12, the gear rim 14. The connecting shaft part 11 mounted in the counter stand 5 is driven from the gear 14 by means of a pinion 13, which connecting shaft part 11 with further gear reduction drives the pinion 23 of the path length counter 6 over the worm 17.

For the rigid connection of the bearing stand 1 and the counter stand 5 after setting the desired rotary angle between these two parts in the end side of the bearing stand, there are provided a plurality of threaded bores 18 and in the end side of the counter stand 5 over a full angle of 360°, with equal radii, a number of curved slots 19 which permit a screwing (screw 20, FIG. 1) of the parts with any selected rotary angle, the bores 18, the slots 19, and the screw 20 constituting a means for rigidly connecting the bearing stand 1 and the counter stand 2 in every relative position with respect to each other.

In order that the counter can count only the distance passed in the moving direction of the vehicle, the gear rim 14 is divided into two approximately equally high gear disc rings 14a and 14b, which are coupled together by means of a free wheeling coupling. The latter consists in the shown embodiment by example in its simplest form of ratchet teeth 21 of the engagement faces of the two gear disc rings and an axial play of its bearing against a low spring force corresponding with the height of the teeth 21.

While we have disclosed one embodiment of the present invention, it is to be understood that the embodiment is given by example only and not in a limiting sense.

We claim:

1. A tachometer with a distance counter, in particular an eddy current tachometer with a drive shaft comprising
   an indicator part containing a distance counter,
   said tachometer including a pointer axle carrying a pointer,
   a drive part of the tachometer rigidly connectable with said indicator part,
   a drive shaft mounted in said drive part and inclined or at any angle with respect to said pointer axle,
   a speed reduction drive of said distance counter operatively connected with said drive shaft by means of a divided connecting shaft means between said drive part and said indicator part,
   said drive part being adjustably arranged concentrically about said pointer axle about any relative angular position relative to said indicator part,
   means for rigidly connecting of both said parts in every relative position of said parts,
   said connecting shaft means for driving said distance counter operatively via said drive shaft being divided into two shaft parts, one of which being separately mounted in said drive part and the other being separately mounted in said indicator part,
   a pinion rigidly mounted on each shaft part,
   a gear rim being concentrically rotatably mounted relative to said pointer axle of said tachometer, and
   said pinions being coupled to said gear rim, said two shaft parts being operatively coupled together by means of said pinions.

2. The tachometer, as set forth in claim 1, wherein said gear rim is divided into two intermeshing tooth locking disc rings, and including a free wheeling coupling means for coupling together said two disc rings.

3. The tachometer, as set forth in claim 2, wherein said free wheeling coupling means comprises a ratchet toothing of engagement faces of said tooth locking disc rings, and the mounting of the latter has a spring-biased axial play corresponding with the height of said toothing.

* * * * *